(12) United States Patent
Shimotani et al.

(10) Patent No.: US 8,890,819 B2
(45) Date of Patent: Nov. 18, 2014

(54) DISPLAY INPUT DEVICE AND VEHICLE-MOUNTED INFORMATION EQUIPMENT

(75) Inventors: Mitsuo Shimotani, Tokyo (JP); Tsutomu Matsubara, Tokyo (JP); Takashi Sadahiro, Tokyo (JP); Masako Ohta, Tokyo (JP); Yuichi Okano, Tokyo (JP); Tsuyoshi Sempuku, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 631 days.

(21) Appl. No.: 13/146,353

(22) PCT Filed: Mar. 16, 2010

(86) PCT No.: PCT/JP2010/001868
§ 371 (c)(1),
(2), (4) Date: Jul. 26, 2011

(87) PCT Pub. No.: WO2010/113397
PCT Pub. Date: Oct. 7, 2010

(65) Prior Publication Data
US 2011/0285657 A1 Nov. 24, 2011

(30) Foreign Application Priority Data
Mar. 31, 2009 (JP) .................. 2009-086375

(51) Int. Cl.
*G06F 3/041* (2006.01)
*G06F 3/0488* (2013.01)

(52) U.S. Cl.
CPC .......... *G06F 3/0418* (2013.01); *G06F 3/04886* (2013.01); *G06F 2203/04805* (2013.01); *G06F 3/0416* (2013.01); *G06F 2203/04101* (2013.01); *G06F 3/0488* (2013.01); *G06F 2203/04108* (2013.01)
USPC ........................................................ 345/173

(58) Field of Classification Search
CPC ... G06F 3/0488; G06F 3/04883; G06F 3/044; G06F 3/04886; G06F 3/045
USPC ........................................................ 345/173
See application file for complete search history.

(56) References Cited

U.S. PATENT DOCUMENTS 5,754,169 A 5/1998 Yashiro
2007/0244613 A1 10/2007 Ishikawa et al.
(Continued)

FOREIGN PATENT DOCUMENTS

DE 102006037156 A1 9/2007
JP 63-066628 A 3/1988
(Continued)

*Primary Examiner* — Aneeta Yodichkas
(74) *Attorney, Agent, or Firm* — Birch, Stewart, Kolasch & Birch, LLP

(57) ABSTRACT

A display input device includes a control unit for correcting horizontal coordinates of an object to be detected on an xy coordinate plane extending on a touch panel 1, which are acquired by a proximity sensor 12, according to an angle of elevation φ, an angle of deviation θ and a vertical distance z between the object to be detected and a surface of the touch panel, φ being the angle of a straight line OC with respect to the surface of the touch panel, the straight line OC extending between a predetermined point O positioned on the touch panel and a predetermined point C positioned outside the touch panel, and θ being the angle between a straight line which is an orthogonal projection of the line OC onto the xy coordinate plane, and an x axis on the xy coordinate plane.

21 Claims, 9 Drawing Sheets

(56) References Cited

U.S. PATENT DOCUMENTS

| | | | |
|---|---|---|---|
| 2007/0252821 A1 | 11/2007 | Hollemans et al. | |
| 2008/0303807 A1 | 12/2008 | Nozawa | |
| 2009/0327977 A1 | 12/2009 | Bachfischer et al. | |
| 2010/0053109 A1* | 3/2010 | Narita | 345/173 |
| 2011/0298704 A1* | 12/2011 | Krah | 345/156 |

FOREIGN PATENT DOCUMENTS

| | | |
|---|---|---|
| JP | 1-181197 A | 7/1989 |
| JP | 4-128877 A | 4/1992 |
| JP | 7-36568 A | 2/1995 |
| JP | 7-244555 A | 9/1995 |
| JP | 10-171600 A | 6/1998 |
| JP | 2006-031499 A | 2/2006 |
| JP | 2006-302029 A | 11/2006 |
| JP | 2007-302223 A | 11/2007 |
| JP | 2008-502982 A | 1/2008 |
| JP | 2008-269225 A | 11/2008 |

* cited by examiner

FIG. 9
*Prior Art*

(When Finger Has Approached)

Point C
Line of Sight Lies on "せ"

Line of Sight

Point A
Fingertip Lies on "く"

DISPLAY INPUT DEVICE AND VEHICLE-MOUNTED INFORMATION EQUIPMENT

FIELD OF THE INVENTION

The present invention relates to a display input device particularly suitable for use in vehicle-mounted information equipment such as a navigation system, and the vehicle-mounted information equipment.

BACKGROUND OF THE INVENTION

A touch panel is an electronic part which is a combination of a display unit like a liquid crystal panel, and a coordinate position input unit like a touchpad, and is a display input device that enables a user to simply touch an image area, such as an icon, displayed on the liquid crystal panel to cause the display input device to detect information about the position of a part of the image area which has been touched by the user, thereby enabling the user to operate target equipment. Therefore, in many cases, a touch panel is incorporated into equipment, such a vehicle-mounted navigation system, which has to mainly meet the need for the user to handle the equipment by following a self-explanatory procedure.

Many proposals for improving the ease of use and usability of a man-machine device including such a touch panel as mentioned above have been applied for patent.

For example, a display input device which, when a user brings his or her finger close to the device, enlarges and displays a key switch which is positioned in the vicinity of the finger so as to facilitate the user's selection operation (for example, refer to patent reference 1), a CRT device which detects a vertical distance of a finger and displays information with a scale of enlargement according to the distance (for example, refer to patent reference 2), an input unit which detects a touch pressure to implement an enlarged display when the touch is a light one and implement a predetermined key operation when the touch is a strong one (for example, refer to patent reference 3), and so on have been known.

RELATED ART DOCUMENT

Patent Reference

Patent reference 1: JP,2006-31499,A
Patent reference 2: JP,04-128877,A
Patent reference 3: JP,10-171600,A

SUMMARY OF THE INVENTION

According to the technology disclosed by above-mentioned patent reference 1, because when a user brings his or her finger close to the touch panel, an enlarged display of icons positioned in the vicinity of the position where the user's finger is close to the touch panel is produced, operation mistakes can be prevented and the user is enabled to easily perform an operation of selecting one of the icons. An example of a screen display on the touch panel in the case of using this technology to search for a place name is shown in FIG. 9. In this figure, a software keyboard including 50 phonetic characters for facility search is displayed, and an enlarged display of the following plural software keys: "い (i)", "き (ki)", "し (shi)", "う (u)", "く (ku)", "す (su)", "え (e)", "け (ke)", and "せ (se)", as the above-mentioned icons in the vicinity of the finger position, is created.

By the way, in the case in which the touch panel is positioned in front of the user's eyes and is mounted in a horizontal position, when the user brings his or her finger close to the enlarged keys (icons) in the display area having a fixed range, the user can easily position his or her finger at the virtual position of an icon. In this case, the touch panel is easy to use.

However, in the case in which the touch panel is mounted while being inclined on account of its design, the direction extending directly upward from the touch panel (i.e., the direction perpendicular to the surface of the touch panel) does not match the direction extending directly upward from a target icon, which is viewed from the user (i.e., the direction of the line connecting the position of the user's eye and the icon). Therefore, there occurs a problem that when the user is going to touch "せ (se)", for example, his or her fingertip is actually at the position of "く (ku)", as shown in FIG. 9, and the usability of the touch panel gets worse.

Furthermore, the same problem occurs in the case in which a touch panel is operated from left and right sides with respect to the front of the touch panel, e.g., when a touch panel of a car navigation device is installed in the center of a center console and is operated by the driver on the driver's seat or a passenger on the front seat next to the driver's seat.

This problem similarly occurs when an enlarged display of an image in a display area having a fixed range is created in the vicinity of the position of an approaching finger or when a cursor is displayed in the vicinity of the position of the finger, and the longer distance between the approaching finger and the touch panel is detected, the larger deviation from the correct coordinates the measured position of the finger has, as disclosed in patent reference 1. Furthermore, the technologies disclosed by above-mentioned patent references 2 and 3 do not solve this problem.

The present invention is made in order to solve the above-mentioned problem, and it is therefore an object of the present invention to provide a display input device and vehicle-mounted information equipment each of which provides an improvement in its usability independently upon the operational environment of a touch panel.

In order to solve the above-mentioned problem, a display input device of the present invention includes: a touch panel having a proximity sensor for detecting coordinates of an object to be detected approaching to said touch panel in a non-contact manner, for carrying out a display of an image and an input of an image; and a control unit for correcting x and y coordinates of the above-mentioned object to be detected, which are acquired by the above-mentioned proximity sensor, according to predetermined functions each having, as variables, an angle of elevation $\phi$, an angle of deviation $\theta$ and a z coordinate, a surface of the above-mentioned touch panel being defined as an xy coordinate plane and a direction perpendicular to the above-mentioned surface of the above-mentioned touch panel being defined as a z axis, the above-mentioned angle of elevation $\phi$ being the one of a straight line OC with respect to the above-mentioned surface of the above-mentioned touch panel, the straight line OC extending between a predetermined point O positioned on the above-mentioned touch panel and a predetermined point C positioned outside the above-mentioned touch panel, and the above-mentioned angle of deviation $\theta$ being the one between a straight line which is an orthogonal projection of the above-mentioned line OC onto the xy coordinate plane, and an x axis on the above-mentioned xy coordinate plane.

Furthermore, vehicle-mounted information equipment in accordance with the present invention which can be connected to a touch panel having a proximity sensor for detecting coordinates of an object to be detected approaching to the touch panel in a non-contact manner, for carrying out a display of an image and an input of an image includes a control unit for receiving the coordinates of the object to be detected inputted thereto from the proximity sensor to correct x and y coordinates of the object to be detected, which are acquired by the proximity sensor, according to predetermined functions each having, as variables, an angle of elevation φ, an angle of deviation θ and a z coordinate, a surface of the touch panel being defined as an xy coordinate plane and a direction perpendicular to the surface of the touch panel being defined as a z axis, the angle of elevation φ being the one of a straight line OC with respect to the surface of the touch panel, the straight line OC extending between a predetermined point O positioned on the touch panel and a predetermined point C positioned outside the touch panel, and the angle of deviation θ being the one between a straight line which is an orthogonal projection of the line OC onto the xy coordinate plane, and an x axis on the xy coordinate plane.

BRIEF DESCRIPTION OF THE FIGURES

FIG. 9 is a view showing an example of a screen configuration displayed by a conventional display input device.

EMBODIMENTS OF THE INVENTION

Hereafter, in order to explain this invention in greater detail, the preferred embodiments of the present invention will be described with reference to the accompanying drawings.

Embodiment 1.

Figure 1:
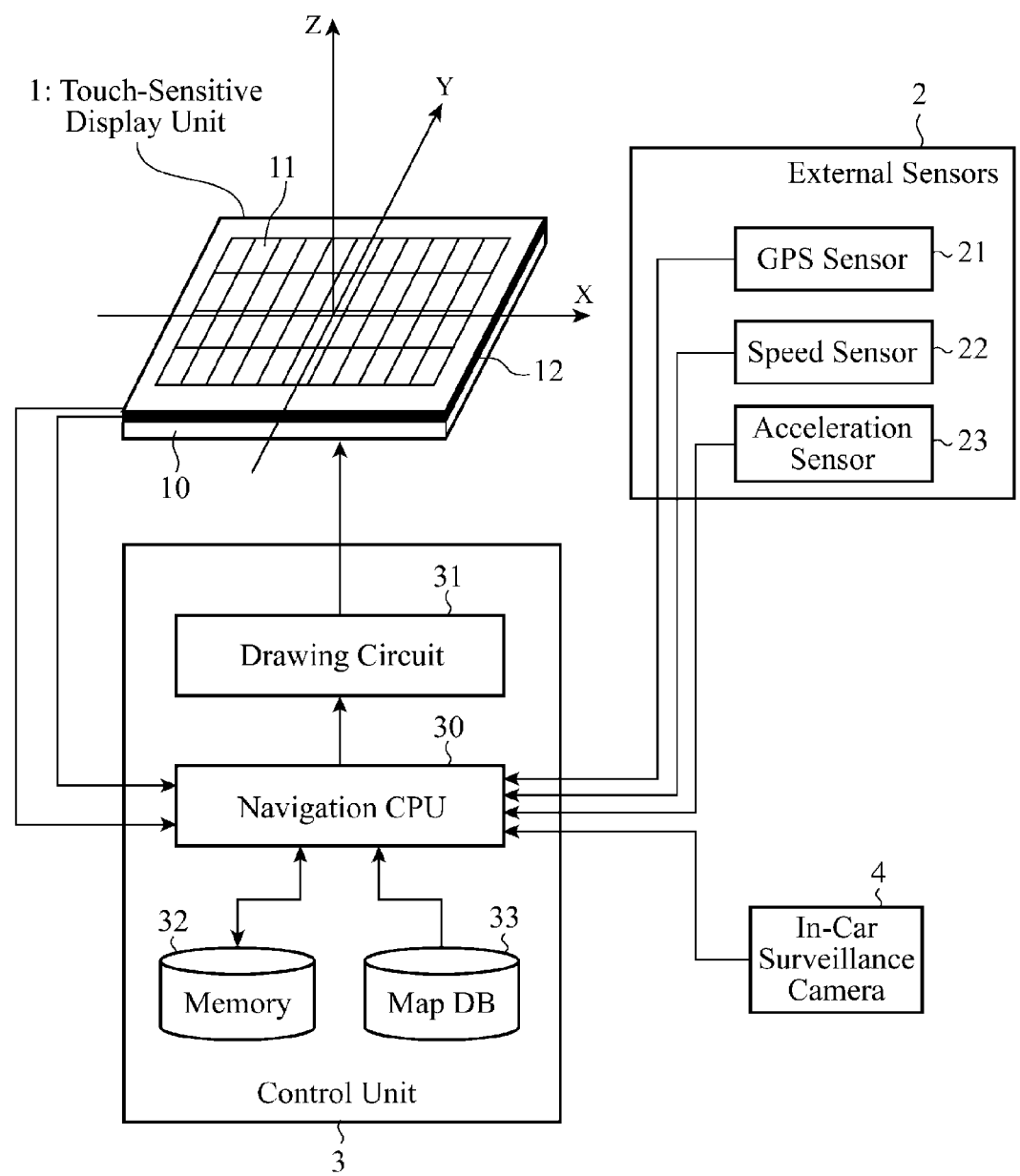
FIG. 1 is a block diagram showing the internal structure of a display input device in accordance with Embodiment 1 of the present invention.

FIG. 1 is a block diagram showing the structure of a display input device in accordance with Embodiment 1 of the present invention. As shown in FIG. 1, the display input device in accordance with Embodiment 1 of the present invention is comprised of a touch-sensitive display unit (abbreviated as a touch panel from here on) 1, external sensors 2, a control unit 3, and an in-car surveillance camera 4.

The touch panel 1 carries out a display of information and an input of information. For example, the touch panel 1 is constructed in such a way that a touch sensor 11 for inputting information is laminated on an LCD panel 10 for displaying information. Furthermore, the touch panel 1 and a plurality of proximity sensors 12 each of which carries out non-contact detection in two dimensions of a movement of an object to be detected, such as a finger or a pen, which is positioned opposite to the touch panel 1 are mounted on a peripheral portion outside the touch sensor 11 on a per-cell basis.

In a case in which each of the proximity sensors 12 uses an infrared ray, infrared ray emission LEDs (Light Emitted Diodes) and light receiving transistors are arranged, as detection cells, opposite to each other on the peripheral portion outside the touch sensor 11 in the form of an array. Each of the proximity sensors 12 detects a block of light emitted therefrom or reflected light which is caused by an approach of an object to be detected to detect the approach and also detects the coordinate position of the object.

The detection cells of the proximity sensors 12 are not limited to the above-mentioned ones each of which employs an infrared ray. For example, sensors of capacity type each of which detects an approach of an object to be detected from a change of its capacitance which occurs between two plates arranged in parallel like a capacitor can be alternatively used. In this case, one of the two plates serves as a ground plane oriented toward the object to be detected, and the other plate side serves as a sensor detection plane, and each of the sensors of capacity type can detect an approach of the object to be detected from a change of its capacitance formed between the two plates and can also detect the coordinate position of the object.

On the other hand, the external sensors 2 can be mounted at any positions in a vehicle, and include at least a GPS (Global Positioning System) sensor 21, a speed sensor 22, and an acceleration sensor 23.

The GPS sensor 21 receives radio waves from GPS satellites, creates a signal for enabling the control unit 3 to measure the latitude and longitude of the vehicle, and outputs the signal to the control unit 3. The speed sensor 22 measures vehicle speed pulses for determining whether or not the vehicle is running and outputs the vehicle speed pulses to the control unit 3. The acceleration sensor 23 measures a displacement of a weight attached to a spring to estimate an acceleration applied to the weight, for example. In a case in which the acceleration sensor 23 is a three-axis one, the acceleration sensor follows an acceleration variation ranging from 0 Hz (only the gravitational acceleration) to several 100 Hz, for example, and measures the direction (attitude) of the weight with respect to the ground surface from the sum total of acceleration vectors in X and Y directions and informs the direction to the control unit 3.

The control unit 3 has a function of correcting horizontal coordinates on the touch panel 1 of an approaching finger, which are acquired by the proximity sensors 12, according to the vertical distance between the touch panel 1 and the finger facing the panel surface, enlarging an image in a display area having a fixed range, which is displayed on the touch panel 1, and displaying the enlarged image in the vicinity of the position of the finger, in addition to basic processing functions for implementing navigation functions, such as a route search and destination guidance.

To this end, the control unit 3 is comprised of a CPU (referred to as a navigation CPU 30 from here on) which mainly carries out navigation processing and controls the touch panel 1, a drawing circuit 31, a memory 32, and a map DB (Data Base) 33.

The navigation CPU 30 carries out a navigation process of, when a navigation menu, such as a route search menu, which is displayed on the touch panel 1 is selected by a user, providing navigation following the menu. When carrying out the navigation process, the navigation CPU 30 refers to map information stored in the map DB 33, and carries out a route search, destination guidance or the like according to various sensor signals acquired from the external sensors 2.

Figure 2:
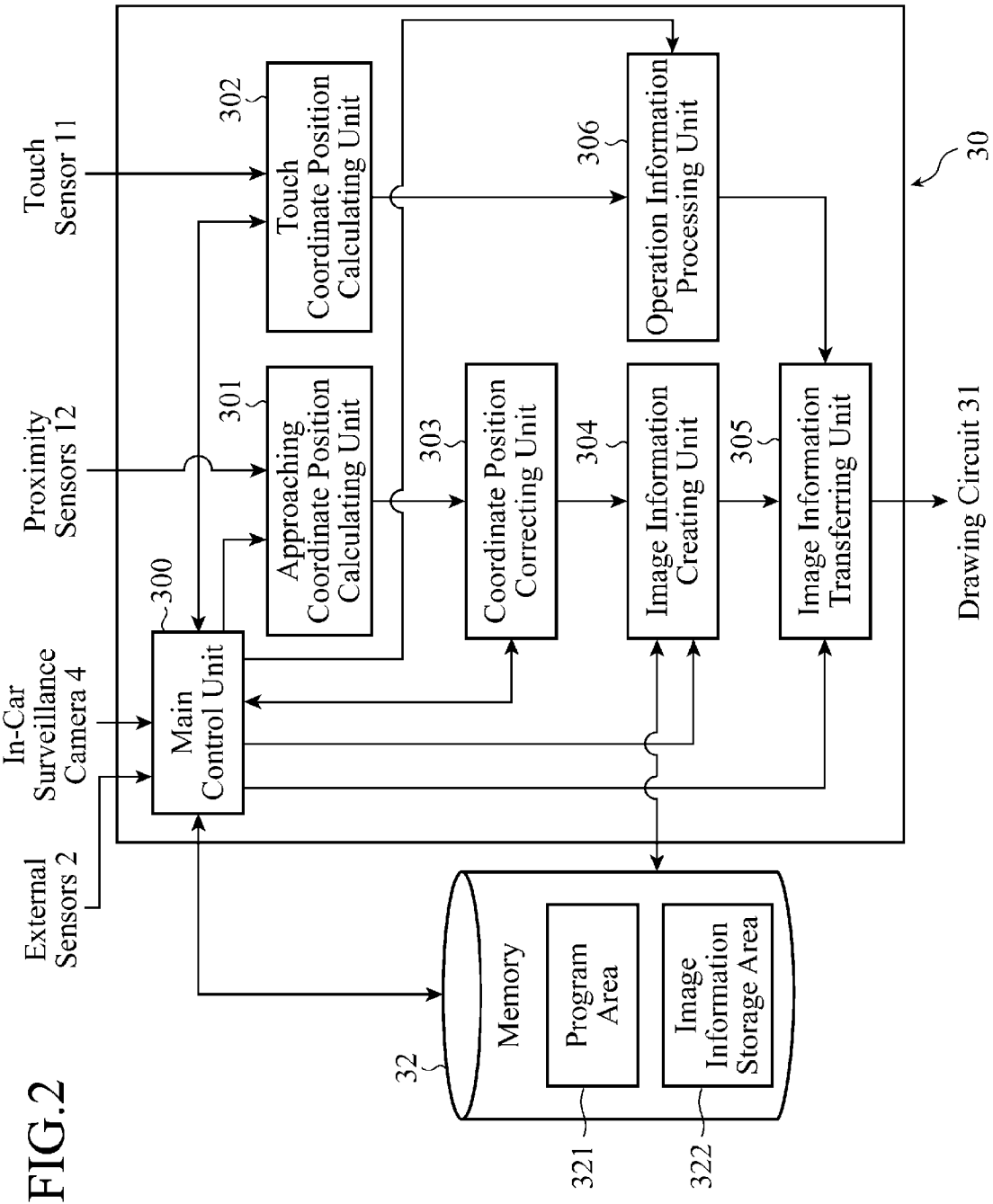
FIG. 2 is a block diagram showing a functional development of the structure of a program executed by a navigation CPU which the display input device in accordance with Embodiment 1 of the present invention has.

Furthermore, in order to implement the function of correcting the horizontal coordinates on the touch panel 1 of the approaching finger, which are acquired by the proximity sensor 12, according to the vertical distance between the touch panel 1 and the finger facing the panel surface, enlarging an image in a display area having a fixed range displayed on the touch panel 1, and displaying the enlarged image in the vicinity of the position of the finger, the navigation CPU 30 creates image information and controls the drawing circuit 31 according to a program stored in the memory 32. The structure of the program which the navigation CPU 30 executes in this case is shown in FIG. 2, and the details of the structure will be mentioned below.

Figure 3:
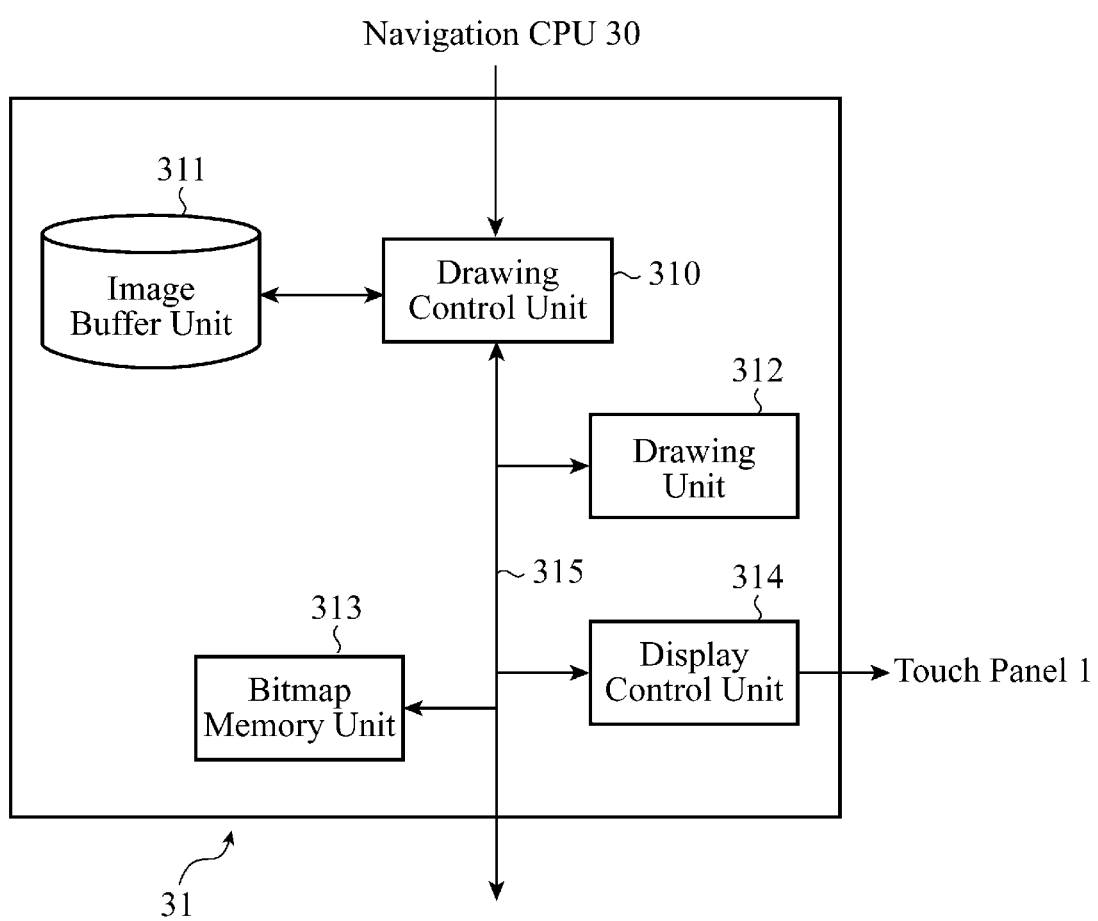
FIG. 3 is a block diagram showing the internal structure of a drawing circuit which the display input device in accordance with Embodiment 1 of the present invention has.

The drawing circuit 31 expands the image information created by the navigation CPU 30 on a bit map memory unit 313 built therein or mounted outside the drawing circuit at a fixed speed, reads image information which is expanded on the bit map memory unit 313 by a display control unit 314 similarly built therein in synchronization with the display timing of the touch panel 1 (the LCD panel 10), and displays the image information on the touch panel 1, as shown in FIG. 3. The details of the above-mentioned bit map memory unit 313 and the above-mentioned display control unit 314 will be mentioned below.

An image information storage area 322 and so on are assigned to a work area of the memory 32, which is provided in addition to a program area 321 in which the above-mentioned program is stored, and image information are stored in the image information storage area 322 of the memory 32. Furthermore, maps, facility information and so on required for navigation including a route search and guidance are stored in the map DB 33.

The in-car surveillance camera 4 is a wide angle CCD (Charge Coupled Device) camera mounted on a room mirror, for example. In this embodiment, the in-car surveillance camera especially monitors a movement of a passenger on the driver's seat and a movement of a passenger on the front seat next to the driver's seat in the cabin of the vehicle, and a created image signal of an image captured by the in-car surveillance camera is outputted to the navigation CPU 30 of the control unit 3.

FIG. 2 is a block diagram showing a functional development of the structure of the program executed by the navigation CPU 30 of FIG. 1 which the control unit 3 of the display input device in accordance with Embodiment 1 of the present invention has. As shown in FIG. 2, the navigation CPU 30 includes a main control unit 300, an approaching coordinate position calculating unit 301, a touch coordinate position calculating unit 302, a coordinate position correcting unit 303, an image information creating unit 304, an image information transferring unit 305, and an operation information processing unit 306.

The approaching coordinate position calculating unit 301 has a function of, when the proximity sensors 12 detect an approach of a finger to the touch panel 1, calculating the XY coordinate position of the finger and delivering the XY coordinate position to the coordinate position correcting unit 303. For example, the coordinate position detected by the proximity sensors is inputted at intervals of 0.01 seconds continuously during a time period of 0.05 seconds, and the average of these five inputs of the coordinate position is calculated as the XY coordinates calculated by the approaching coordinate position calculating unit 301 and is outputted to the correcting unit 303.

The touch coordinate position calculating unit 302 has a function of, when the touch sensor 11 of the touch panel 1 detects a touch of the finger on the touch panel 1, calculating the XY coordinate position of the touch and delivering the XY coordinate position to the main control unit 300, and also starting the operation information processing unit 306.

The coordinate position correcting unit 303 has a function of correcting the horizontal coordinates on the touch panel 1 of the approaching finger, which are calculated by the approaching coordinate position calculating unit 301, according to the vertical distance between the touch panel 1 and the finger facing the panel surface, and controls the image information creating unit 304 under the control by the main control unit 300. A method of correcting the horizontal coordinates of the approaching finger and so on will be mentioned below.

The image information creating unit 304 has a function of creating image information to be displayed on the LCD panel 10 of the touch panel 1 under the control by the main control unit 300, and outputting the image information to the image information transferring unit 305. Furthermore, in order to carry out the process of enlarging an image, such as a software key icon, in a display area having a fixed range which is displayed on the touch panel 1 to display the enlarged image, the image information creating unit 304 reads an already-created image (pixels), such as a software icon image, while skipping at fixed intervals of some pixels, and interpolates intermediate pixels to draw a new image over the on-screen image, for example. For example, when enlarging the already-created image to twice of its original size, the image information creating unit copies the value of each pixel of the original image to each of the four values of an array of two rows and two columns to draw an image and then transferring this image to the drawing circuit 31. In contrast with this, when reducing the original image, the image information creating unit thins out the pixels of the original image while skipping at fixed intervals of some pixels to update the image and then transferring this updated image to the drawing circuit 31. Although the method of enlarging or reducing the original bitmap image is explained as an example, in a case of processing a vector image instead of a bit image, the vector image can be enlarged or reduced to a more beautiful image through a predetermined enlarging and reducing computation.

The image information transferring unit 305 has a function of transferring the image information created by the image information creating unit 304 to the drawing circuit 31 under the timing control by the main control unit 300.

The operation information processing unit 306 has a function of inputting operation information defined for information in the display area having a fixed range which is based on the coordinate position of the touch calculated by the touch coordinate position calculating unit 302 under the control by the main control unit 300. For example, when the information is a software keyboard, the operation information processing unit inputs information based on a software key icon. When the information is a button icon, the operation information processing unit carries out a navigation process defined for the button icon, such as a destination search.

The work area having a predetermined amount of storage, in addition to the program area 321 in which the above-mentioned program is stored, is assigned to the memory 32. In this work area, the image information storage area 322 in which the image information created by the image information creating unit 304 is stored temporarily is included.

FIG. 3 is a block diagram showing the internal structure of the drawing circuit 31 shown in FIG. 1. As shown in FIG. 3, the drawing circuit 31 is comprised of a drawing control unit 310, an image buffer unit 311, a drawing unit 312, the bitmap memory unit 313, and the display control unit 314. They are commonly connected to one another via a local bus 315 which consists of a plurality of lines used for address, data and control.

In the above-mentioned construction, the image information transferred from the navigation CPU 30 shown in FIG. 2 (the image information transferring unit 305) is held by the image buffer unit 311 under the control by the drawing control unit 310, and the drawing control unit 310 decodes a command such as a straight line drawing command or a rectangle drawing command, or carries out preprocessing about the slope of a line or the like prior to a drawing process. The drawing unit 312, which is started by the drawing control unit 310, then carries out high-speed drawing of the image information decoded by the drawing control unit 310 into the bitmap memory unit 313, and the display control unit 314 reads and displays the image information held by the bitmap memory unit 313 in synchronization with the display timing of the LCD panel 10 of the touch panel 1.

Figure 4:
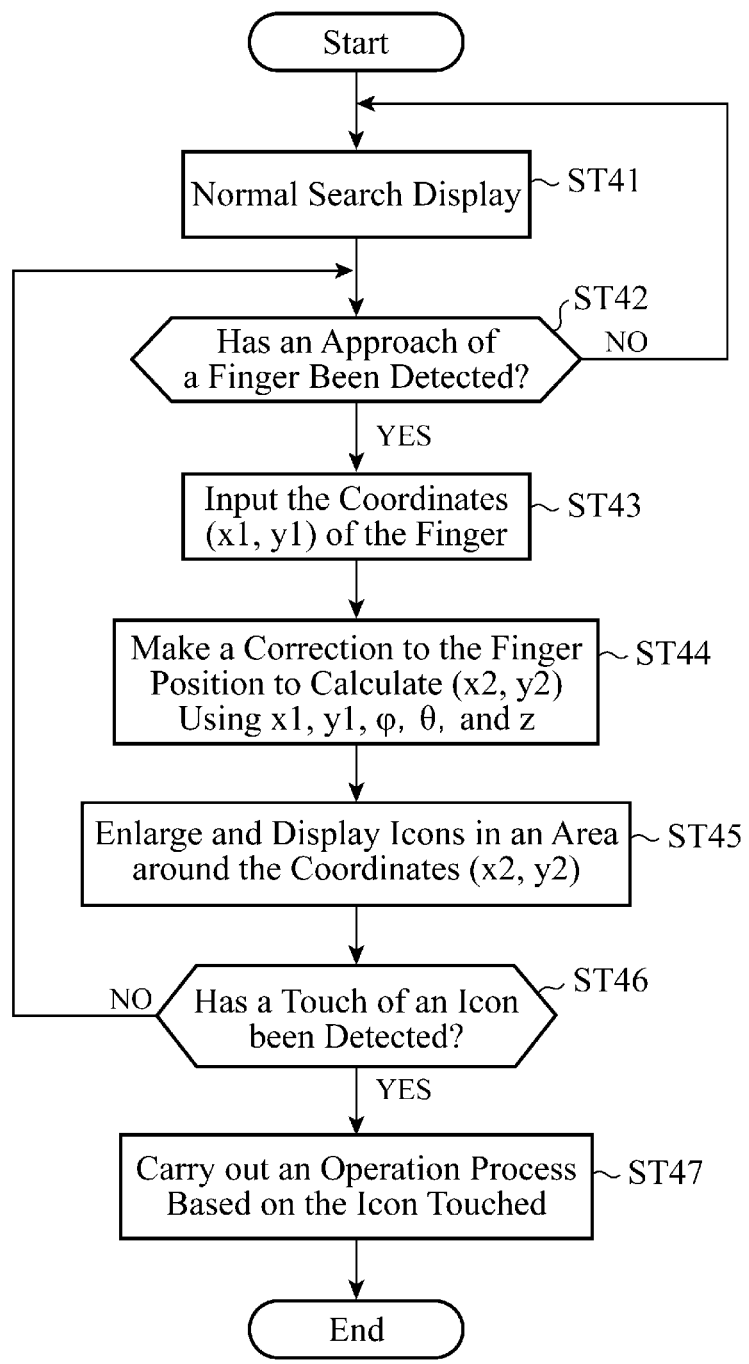
FIG. 4 is a flow chart showing the operation of the display input device in accordance with Embodiment 1 of the present invention.
Figure 5:
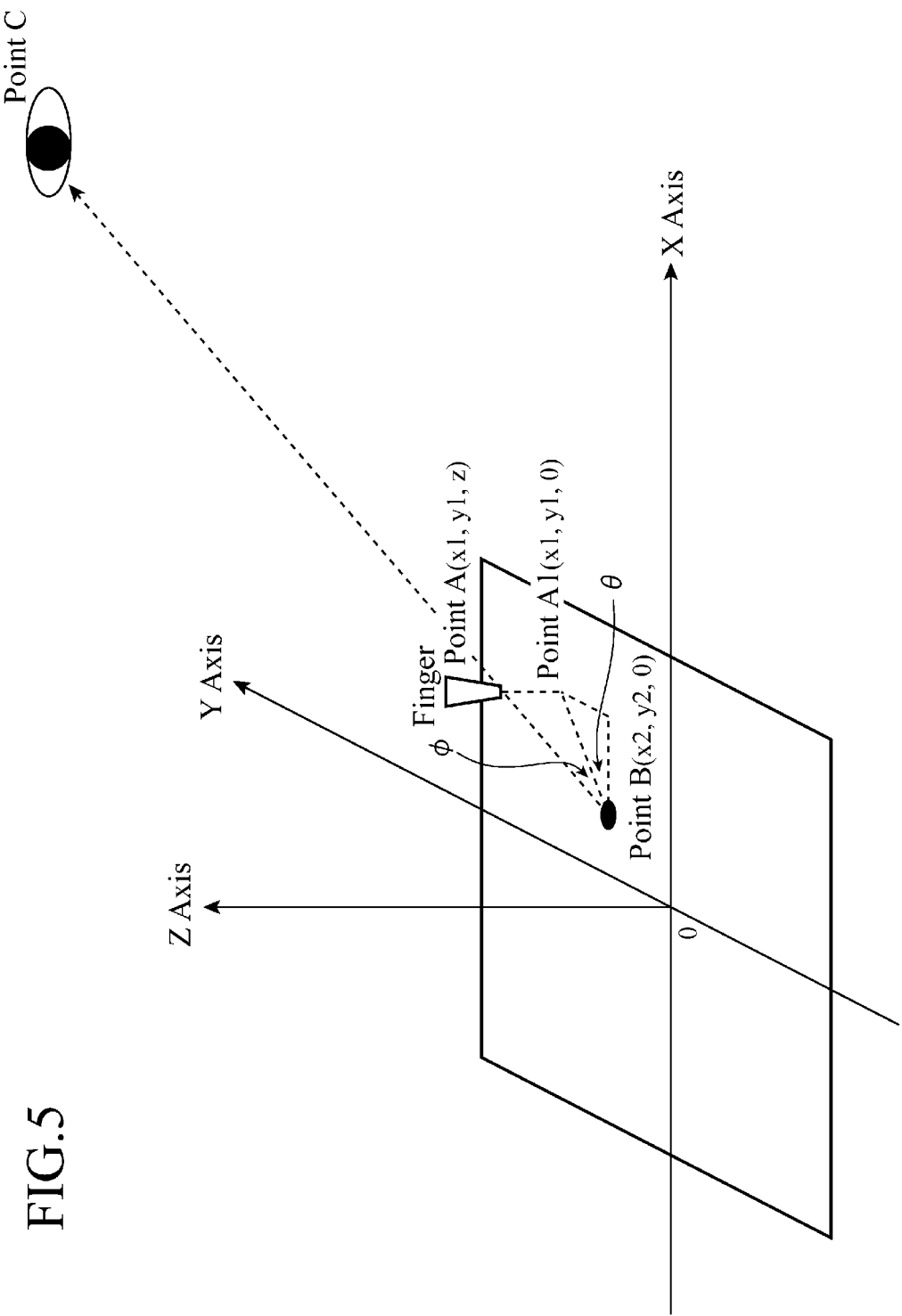
FIG. 5 is a schematic diagram showing the principle behind a coordinate position correction made by the display input device in accordance with Embodiment 1 of the present invention.

FIG. 4 is a flow chart showing the operation of the display input device in accordance with Embodiment 1 of the present invention. Furthermore, FIG. 5 is a view schematically showing the principle behind the coordinate position correction, and FIG. 6 is a view showing an example of the software keyboard image displayed on the touch panel 1.

Hereafter, the operation of the display input device in accordance with Embodiment 1 of the present invention shown in FIGS. 1 to 3 will be explained in detail with reference to FIGS. 4 to 6.

Figure 6:
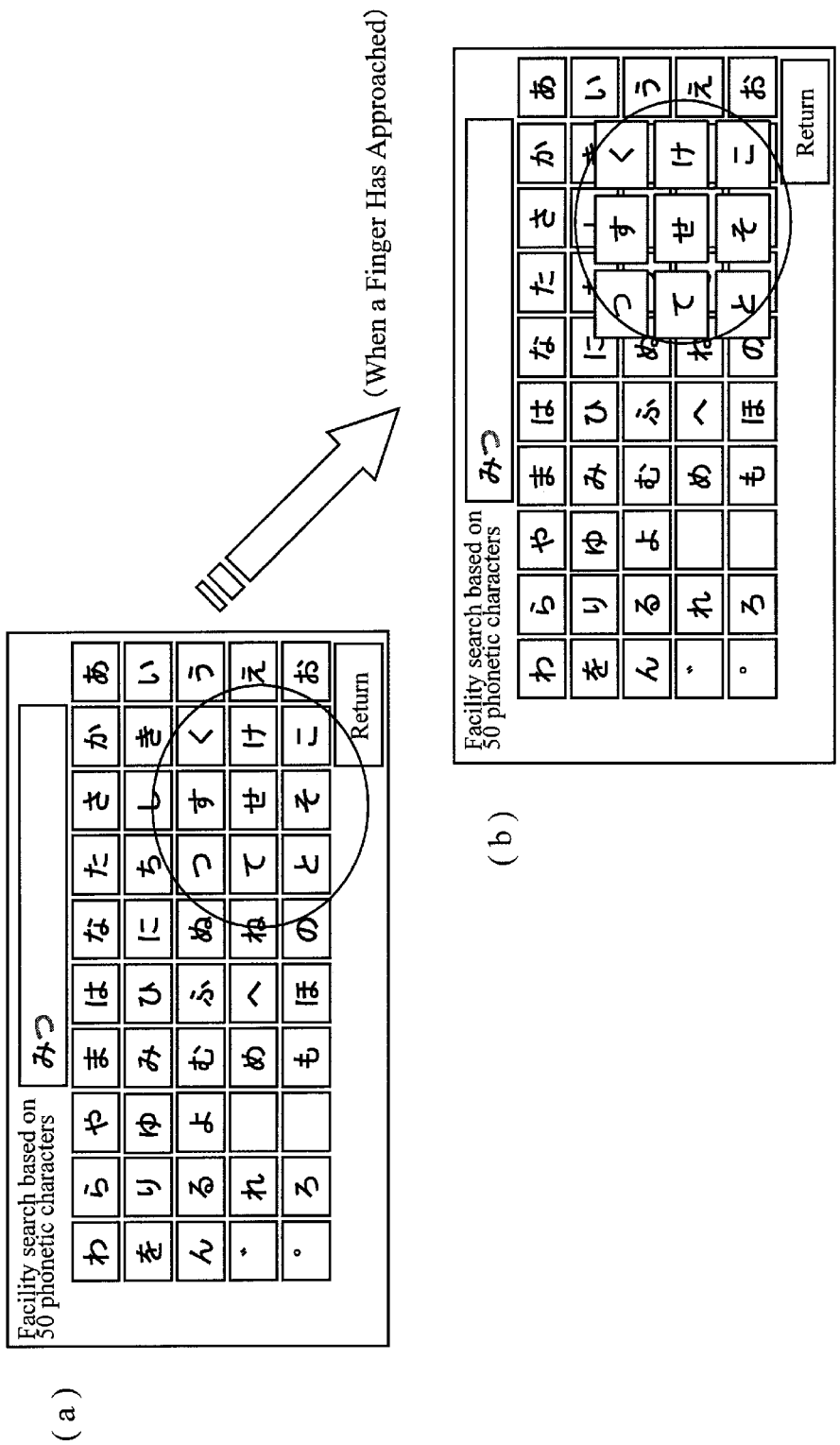
FIG. 6 is a view showing an example of a screen configuration displayed by the display input device in accordance with Embodiment 1 of the present invention.

In FIG. 4, a software keyboard image used at the time of a facility search as shown in FIG. 6(*a*) is displayed on the LCD panel 10 of the touch panel 1, for example (step ST41). In this state, when a user brings his or her finger close to the touch panel 1 first, the proximity sensors 12 detect the approach of the finger (if "YES" in step ST42), and the approaching coordinate position calculating unit 301 of the navigation CPU 30 starts operating, calculates the coordinates (x1, y1) of the finger and inputs the coordinates calculated thereby to the coordinate position correcting unit 303 (step ST43).

When receiving the coordinates, the coordinate position correcting unit 303 corrects the finger coordinates (x1, y1) on the touch panel 1, which are acquired by the proximity sensors 12, according to the vertical distance between the touch panel 1 and the finger facing the panel surface to express the corrected coordinates as (x2, y2).

More specifically, the coordinate position correcting unit 303 calculates the corrected horizontal coordinates (x2, y2) of the approaching finger according to the following operational expressions: x2=x1−f(z)·cot φ·cos θ and y2=y1−g(z)·cot φ·sin θ (step ST44), where the horizontal coordinates of the finger calculated by the approaching coordinate position calculating unit 301 are expressed as (x1, y1) and the corrected horizontal finger coordinates are expressed as (x2, y2), as mentioned above, and where a direction extending from a central point O placed on the above-mentioned touch panel toward an eye's position C is predetermined, an angle of elevation of a straight line OC with respect the above-mentioned touch panel surface is expressed as φ, an angle of deviation θ between a straight line which is an orthogonal projection of the above-mentioned line OC onto an xy coordinate plane extending on the above-mentioned touch panel, and an X axis on the above-mentioned xy coordinate plane is expressed as θ, and the vertical distance between the touch panel 1 and the finger facing the panel surface is expressed as z. In the above expressions, it is assumed that the following relationship: f(z)=g(z)=z/2=1 is satisfied.

The principle behind the above-mentioned coordinate position correction made by the coordinate position correcting unit 303 will be explained hereafter with reference to a schematic diagram shown in FIG. 5.

In FIG. 5, the position of the user's finger at the time of operating the touch panel 1, and how an icon is viewed by the user are shown in three dimensions. In FIG. 5, a point A shows the finger position which is calculated and outputted by the approaching coordinate position calculating unit 301 when the user brings his or her finger close to the touch panel 1 and the coordinates of the point are expressed as (x1, y1, z) (the detected coordinates of the position when the user brings his or her finger close to the point A with the aim of touching an icon displayed at a point B), and the point B shows the display position of the icon on the surface of the LCD panel 10 of the touch panel 1. When software key icons shown in FIG. 9 are cited as an example, the point B shows the display position of "せ (se)" and its coordinates are (x2, y2, 0). φ is the angle of elevation showing the direction of the eye's position C which is viewed from the point of origin O, and θ is the angle of deviation between the straight line which is an orthogonal projection of the straight line OC onto the xy coordinate plane and the X axis on the above-mentioned xy coordinate plane.

As can be seen from FIG. 5, the corrected horizontal coordinates (x2, y2) of the approaching finger can be calculated by executing the following operational expressions (1) and (2).

$$x2 = x1 - z \cdot \cot \phi \cdot \cos \theta \tag{1}$$

$$y2 = y1 - z \cdot \cot \phi \cdot \sin \theta \tag{2}$$

In this embodiment, by assuming a case in which a touch panel of a car navigation is installed, as the touch panel 1, in the center of the center console of the vehicle and is operated by the driver on the driver's seat and a passenger on the front seat, and, when a user's finger approaches to within a distance of about 2 cm of the surface of the touch panel, the horizontal coordinates of the finger can be calculated (a distance in the Z axial direction is measured as a fixed value Zref=2 cm), an eye's direction which is assumed from the viewpoint of the structure of the system is set as θ and φ. In this case, it is assumed that θ is 30 degrees and φ is 75 degrees. Although Zref=2 cm, θ=30 degrees, and φ=75 degrees are assumed for the convenience of this explanation, the parameters are not limited to these settings, respectively, and these settings can be changed according to the structure of the system.

Although the above explanation is made assuming that the touch panel is sufficiently distant from the eye's position (point C), there is only a negligible difference between the angle of deviation of each of B, A, and C with respect to the panel surface and the angle of deviation θ of O-C with respect to the panel surface and therefore they are the same as each other, and there is only a negligible difference between the angle of elevation of each of B, A, and C with respect to the panel surface and the angle of elevation φ of O-C with respect to the panel surface and therefore they are the same as each other, the angle of deviation and the angle of elevation of each of B, A, and C with respect to the surface can be acquired correctly through geometric calculations by simply predetermining not only the direction of the point C but also the three-dimensional position of the point, and the position correction can be made by using the correctly-calculated angles of deviation and the correctly-calculated angles of elevation.

In this case, because the correction is made more effectively as the eye's position C gets close to the touch panel, the usability of this display input device can be further improved.

In this case, $\phi$ is the angle of elevation of a straight line BC connecting the point C and a point B at which a straight line connecting the point C and the point A intersects the touch panel, the angle of elevation being viewed from the touch panel surface, and $\theta$ is the angle of deviation between a straight line which is an orthogonal projection of the straight line BC onto the xy coordinate plane and the X axis on the above-mentioned xy coordinate plane.

Furthermore, although the polar coordinate system is used for the convenience of this explanation, this embodiment is not limited to this polar coordinate system and a rectangular coordinate system can be alternatively used.

Furthermore, because the user can recognize to some extent that the virtual coordinate position x2 is actually x1 from the glass thickness of the LCD panel 10 of the touch panel 1, and so on, the high accurate geometric correction is not necessarily required.

Therefore, the coordinate position correcting unit 303 calculates the corrected horizontal coordinates (x2, y2) of the approaching finger, which are outputted thereby, by executing the following operation expressions (3) and (4), where the horizontal coordinates of the finger calculated by the approaching coordinate position calculating unit 301 are expressed as (x1, y1) and the corrected horizontal finger coordinates are expressed as (x2, y2), as mentioned above, and where the central point O placed on the above-mentioned touch panel and the eye's position C are predetermined, the angle of elevation of the straight line OC with respect to the above-mentioned touch panel surface is expressed as $\phi$, the angle of deviation between a straight line which is an orthogonal projection of the above-mentioned line OC onto the xy coordinate plane extending on the above-mentioned touch panel, and the x axis on the above-mentioned xy coordinate plane is expressed as $\theta$, and the vertical distance between the touch panel 1 and the finger facing the panel surface is expressed as z.

$$x2 = x1 - f(z) \cdot \cot \phi \cdot \cos \theta \quad (3)$$

$$y2 = y1 - g(z) \cdot \cot \phi \cdot \sin \theta \quad (4)$$

In this case, when f(z)=g(z)=z is assumed, the correction is too strong and the user may feel uncomfortable. Therefore, the correction is weakened by assuming f(z)=g(z)=z/2. In this case, by assuming that the detected distance is equal to a constant value Zref (2 cm), the following equation: f(z)=g(z)=z/2=1 is provided.

Returning the explanation to the flow chart of FIG. 4, the coordinate position correcting unit 303 outputs the coordinates (x2, y2) which are corrected in the above-mentioned way to the main control unit 300 and the image information creating unit 304. The image information creating unit 304 carries out an enlargement process of enlarging an image in a display area having a fixed range on the basis of the coordinates which the image information creating unit has acquired under the control by the main control unit 300 to create image information for displaying the image in the vicinity of the finger position. The image information creating unit 304 can create a desired screen display on the LCD panel 10 of the touch panel 1 by further transferring the created image information to the drawing circuit 31 via the image information transferring unit 305 (step ST45).

More specifically, in order to carry out the process of enlarging the image in the display area having the fixed range which is displayed on the touch panel 1, the image information creating unit 304 reads the image information in a partial area (in a circle in the figure) of the already-created software keyboard from the image information storage area 322 of the memory 32 while skipping at fixed intervals of some pixels, and interpolates intermediate pixels to combine this image with image information (no enlargement) about a surrounding image into new image information, and update the software keyboard image by using the new image information, as shown in FIG. 6(a), for example.

The updated image information is outputted to the image information transferring unit 305 while the updated image information is stored in the image information storage area 322 of the memory 32. The image information transferring unit 306 receives the updated image information and then transfers this image information to the drawing circuit 31, and the drawing circuit 31 expands the image information transferred thereto from the drawing control unit 310, and the drawing unit 312 draws the expanded image information into the bitmap memory unit 313 at a high speed. Finally, the display control unit 314 reads the image drawn in the bitmap memory unit 313 to create an enlarged screen display on the LCD panel 10 of the touch panel 1 (step ST45). In FIG. 6(b), an example of the software keyboard image in which the image in the display area having the fixed range (key icons including "つ (tu)", "て (te)", "と (to)", "す (su)", "せ (se)", "そ (so)", "く (ku)", "け (ke)", and "こ (ko)") is enlarged and is displayed in the vicinity of the finger position is shown.

When the touch sensor 11 of the touch panel 1 detects that the finger has touched an icon (if "YES" in step ST46), the touch coordinate position calculating unit 302 calculates the coordinate position of the touch and then starts the operation information processing unit 306 under the control by the main control unit 300.

As a result, the operation information processing unit 306 carries out an operation process based on the key corresponding to the coordinates of the touch calculated by the touch coordinate position calculating unit 302 (step ST47).

As previously explained, in the display input device in accordance with Embodiment 1 of the present invention, the control unit 3 corrects the horizontal coordinates of an approaching finger on the touch panel 1, which are acquired by the proximity sensors 12, according to the vertical distance between the touch panel 1 and the finger facing the panel surface, and carries out the enlargement process of enlarging an image in a display area having a fixed range which is displayed on the touch panel 1 to display the enlarged image in the vicinity of the finger position. Because the display input device thus corrects the finger position to determine a virtual finger position on the touch panel 1 automatically, the user is enabled to perform an input operation without being conscious of the input operation, and therefore the usability of the display input device can be improved. Although the application of this embodiment to an enlarged display is shown above, the image control example is not limited to this application. This embodiment can be applied to a case in which an approaching state of a finger is detected to display a balloon including a detailed explanation such as a help screen, and a case in which the position of a cursor is corrected and displayed. In this case, the shape of the image does not have to be deformed.

The navigation CPU 30 (the coordinate position correcting unit 303) can change the strength of the correction according to the type of icons which are displayed and the finger position. For example, in the case of displaying a cursor having a movement, the navigation CPU sets f(z) and g(z) in such a way that they satisfy the following relationship: $f(z)=g(z)=\frac{1}{2}$ in the operation expression (3). In contrast, in the case of displaying key icons having no movement, the navigation CPU sets $f(z)$ and $g(z)$ in such a way that they satisfy the following relationship: $f(z)=g(z)=\frac{2}{3}$ in the operation expression (3) to increase the strength of the correction as compared with the case of displaying a cursor having a movement. In this case, the display input device can display the image while giving a higher priority to either speed or display. Because the user can select one of these modes according to the scene in which the display input device is used, the convenience of the display input device is improved.

Furthermore, the strength of the correction can be changed by installing a tilt sensor within the touch panel 1 to detect the tilt of the touch panel 1 with respect to the central axis of the touch panel 1, for example. A method of changing the strength of the correction is the same as the above-mentioned method of changing the strength of the correction according to the type of icons.

Furthermore, when determining the eye's direction or correcting the eye's direction, the visual observation position can be detected by carrying out image processing by using the in-car surveillance camera 4, for example. The user's viewpoint position can be alternatively estimated by detecting the angle of each seat in the vehicle or the like by using a sensor instead of using the in-car surveillance camera.

Embodiment 2.

In above-mentioned Embodiment 1, although the example in which only whether or not a user's finger has approached to the touch panel is detected and the detected distance from the touch panel to the position of the finger in a direction of the Z axis is assumed to be a constant value Zref is explained, it can be considered that if the distance between the approaching finger and the touch panel in the Z axial direction can be detected, the strength of the correction is changed according to the distance in the Z axial direction. In this case, it is desirable that the correction is controlled in such a way that it is weakened as the distance between the approaching finger and the touch panel in the Z axial direction increases, whereas the correction is strengthened as the distance between the approaching finger and the touch panel in the Z axial direction decreases.

More specifically, because the user understands that the accuracy of the detected coordinate position gets worse as the distance between the finger and the touch panel in the Z axial direction increases, the adjustment of the strength of the correction is a consideration to preventing the correction from rising in prominence when the distance between the finger and the touch panel in the Z axial direction is long, thereby preventing the user from feeling uncomfortable in the correction. Hereafter, a coordinate position correcting operation performed by the display input device in accordance with Embodiment 2 will be explained.

In Embodiment 2 which will be explained hereafter, the display input device in accordance with the present invention is applied to a three-dimensional touch panel which can measure the distance between the panel surface of the touch panel 1 and a finger in the Z direction. Therefore, the explanation will be made by replacing the touch panel 1, as shown in FIG. 1, which can detect only an approach of a finger in the X and Y directions with the three-dimensional touch panel that can also measure a distance in the Z direction.

Therefore, an approaching coordinate position calculating unit 301 is upgraded from that in accordance with Embodiment 1 in such a way as to be able to calculate a three-dimensional coordinate position of a finger. The other structural components of the display input device in accordance with Embodiment 2 are the same as those in accordance with Embodiment 1. Because a technology of measuring a three-dimensional position of an approaching finger is disclosed by above-mentioned patent reference 2, the explanation will be made assuming that this technology is simply applied to this embodiment.

Processes including a normal search display, a process of detecting an approach of a finger which is performed by proximity sensors 12, and a process of calculating coordinates of the finger and then inputting the coordinates to a coordinate position correcting unit 303 which is performed by the approaching coordinate position calculating unit 301 are the same as those in accordance with Embodiment 1 shown in FIG. 4.

In this case, the coordinate position correcting unit 303 corrects the finger coordinates acquired from the approaching coordinate position calculating unit 301 by executing the following operational expressions. More specifically, in the case of $z<2$ cm, the coordinate position correcting unit executes the following operational expressions: $x2=x1-z\cdot\cot\phi\cdot\cos\theta$ and $y2=y1-z\cdot\cot\phi\cdot\sin\theta$, whereas in the case of 2 cm$<=z<5$ cm, the coordinate position correcting unit executes the following operational expressions: $x2=x1-(\frac{1}{2})z\cdot\cot\phi\cdot\cos\theta$, and $y2=y1-(\frac{1}{2})z\cdot\cot\phi\cdot\sin\theta-(3/2)19\cot\phi\cdot\sin\theta$. In addition, in the case of $z>=5$ cm, the coordinate position correcting unit determines that no finger has approached and skips the correcting process.

An image information creating unit 304 then carries out an enlargement process of enlarging an image in a display area having a fixed range on the basis of the coordinates which the image information creating unit has acquired under the control by a main control unit 300 to create image information for displaying the image in the vicinity of the finger position. The image information creating unit then transfers the created image information to a drawing circuit 31 via a image information transferring unit 305 to create a desired screen display on the touch panel 1.

As previously explained, in the display input device in accordance with Embodiment 2 of the present invention, a navigation CPU 30 of a control unit 3 can change the strength of the correction according to the vertical distance between the touch panel 1 and the finger facing the panel surface. For example, the navigation CPU can control the correction in such a way that the correction is weakened as the distance between the finger and the touch panel in the Z axial direction increases, whereas the correction is strengthened as the distance between the finger and the touch panel in the Z axial direction decreases, and therefore can prevent the correction from rising in prominence when the distance between the finger and the touch panel in the Z axial direction is long, thereby preventing the user from feeling uncomfortable in the correction.

Furthermore, because the display input device in accordance with Embodiment 2 of the present invention can implement a high-precision correction to the detected coordinate position as compared with that in accordance with Embodiment 1, and corrects the finger position to determine a virtual finger position on the touch panel 1 automatically, like that in accordance with Embodiment 1, the user is enabled to perform an input operation without being conscious of the input operation, and therefore the usability of the display input device can be improved.

When changing the strength of the correction, the navigation CPU 30 (the coordinate position correcting unit 303) does not necessarily limit the correction to the use of the operational expressions defined for each of the above-mentioned distance ranges in the Z axial direction, and can alternatively change the corrected value along a curve according to the distance in the Z axial direction, for example.

Furthermore, when determining an eye's direction or correcting the eye's direction, the user's view-point position can be detected by carrying out image processing by using an in-car surveillance camera 4, for example. The user's viewpoint position can be alternatively estimated by detecting the angle of each seat in the vehicle or the like by using a sensor instead of using the in-car surveillance camera.

Furthermore, in a case in which the touch panel is intended for FA (Factory Automation) or the like, and an operator can freely change his or her position with respect to the touch panel when operating the touch panel, for example, the display input device can change the values of θ and φ dynamically by measuring the direction of the operator's eye or the operator's position by carrying out image processing.
Embodiment 3.

The display input device in accordance with any one of above-mentioned Embodiments 1 and 2 of the present invention makes a coordinate position correction by assuming the position of an operator's eye to some extent. In contrast, in Embodiment 3 which will be explained hereafter, an example in which a coordinate position correction is made by assuming a case in which two or more operators exist in a vehicle and the positions of their eyes differ from one another, e.g., a case in which the driver operates a touch panel of a car navigation installed in the center of a center console from the driver's seat and a passenger operates the touch panel from the front seat next to the driver's seat will be explained.

A display input device in accordance with this embodiment can change the strength of the correction by detecting whether either the driver on the driver's seat or a passenger on the front seat operates the touch panel 1 by performing image processing, as will be explained below.

The method of detecting whether either the driver on the driver's seat or a passenger on the front seat has operated the touch panel is not limited only to the one of performing image processing. Needless to say that there exist various methods including a method of carrying out the detection of whether either the driver on the driver's seat or a passenger on the front seat operates the touch panel by using a change in the capacitance between the operator and the touch panel.

Figure 7:
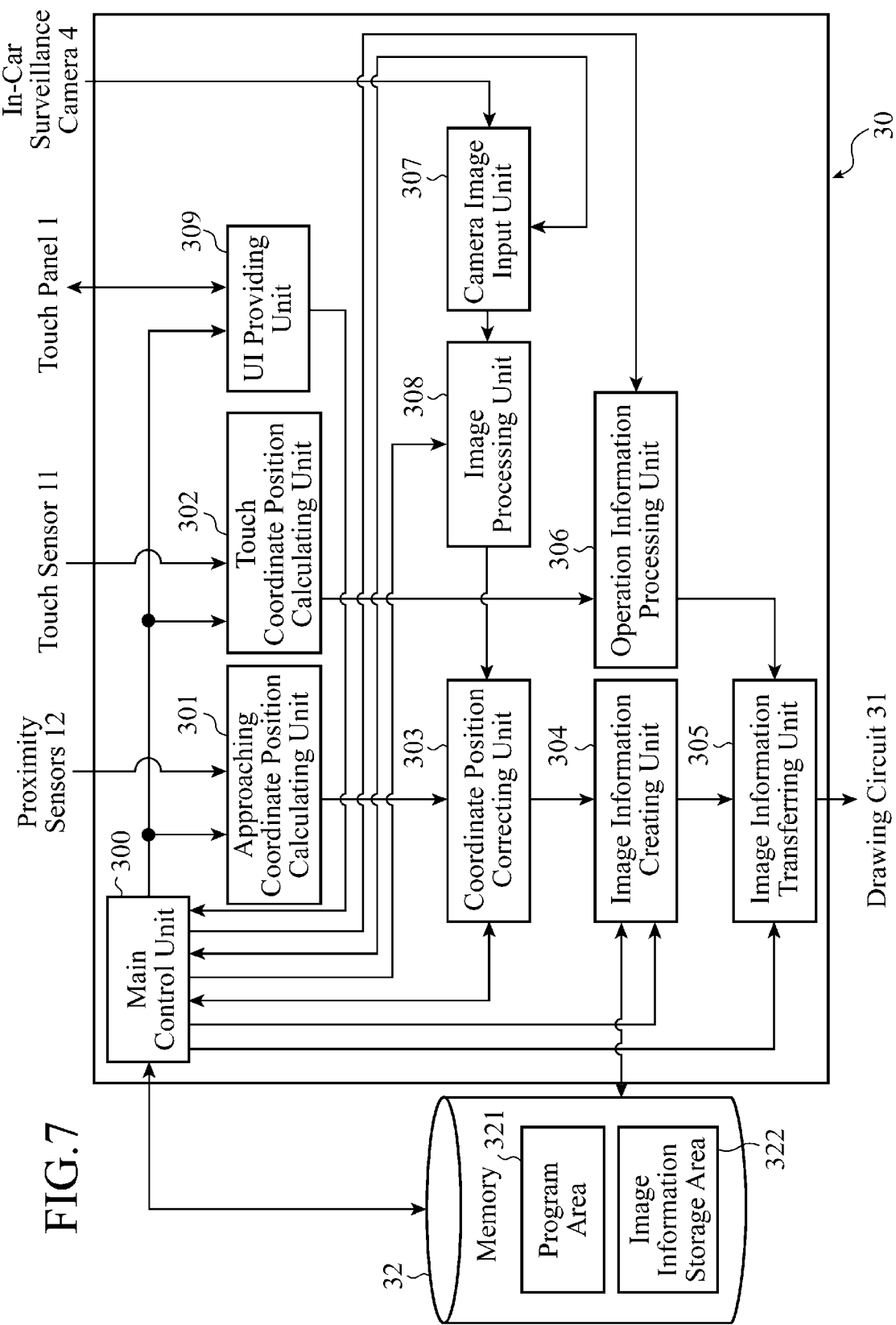
FIG. 7 is a block diagram showing a functional development of the structure of a program executed by a navigation CPU which a display input device in accordance with Embodiment 3 of the present invention has.

FIG. 7 is a block diagram showing a functional development of the structure of a program executed by a control unit 3 (a navigation CPU 30) which the display input device in accordance with Embodiment 3 of the present invention has.

The program structure of the control unit 3 (the navigation CPU 30) of the display input device in accordance with Embodiment 3 of the present invention differs from that according to any one of Embodiments 1 and 2 in that a camera image input unit 307, an image processing unit 308, and a UI (User Interface) providing unit 309 are added to the program structure which the control unit 3 in accordance with Embodiment 1 has.

The camera image input unit 307 has a function of acquiring signals outputted by an in-car surveillance camera 4, and then delivering the signals to a main control unit 300. An image signal acquired from the in-car surveillance camera 4 among these signals is furnished also to the image processing unit 308.

The image processing unit 308 has a function of performing image processing on the image signal acquired from the in-car surveillance camera 4 to recognize which one of the right-side and left-side users has operated the touch panel, or detecting from which one of the left and right sides of the vehicle an input operation with an approach of a finger to the touch panel 1 has been performed, and then controlling the direction and strength of a correction made by a coordinate position correcting unit 303.

The UI providing unit 309 has a function of dynamically displaying a setting screen for defining the strength of the correction on an LCD panel 10 of the touch panel 1 at the time of a configuration setting or in response to the user's request, and being able to change the operational expressions mentioned above according to a setting made by the user and inputted via the touch panel 1.

Figure 8:
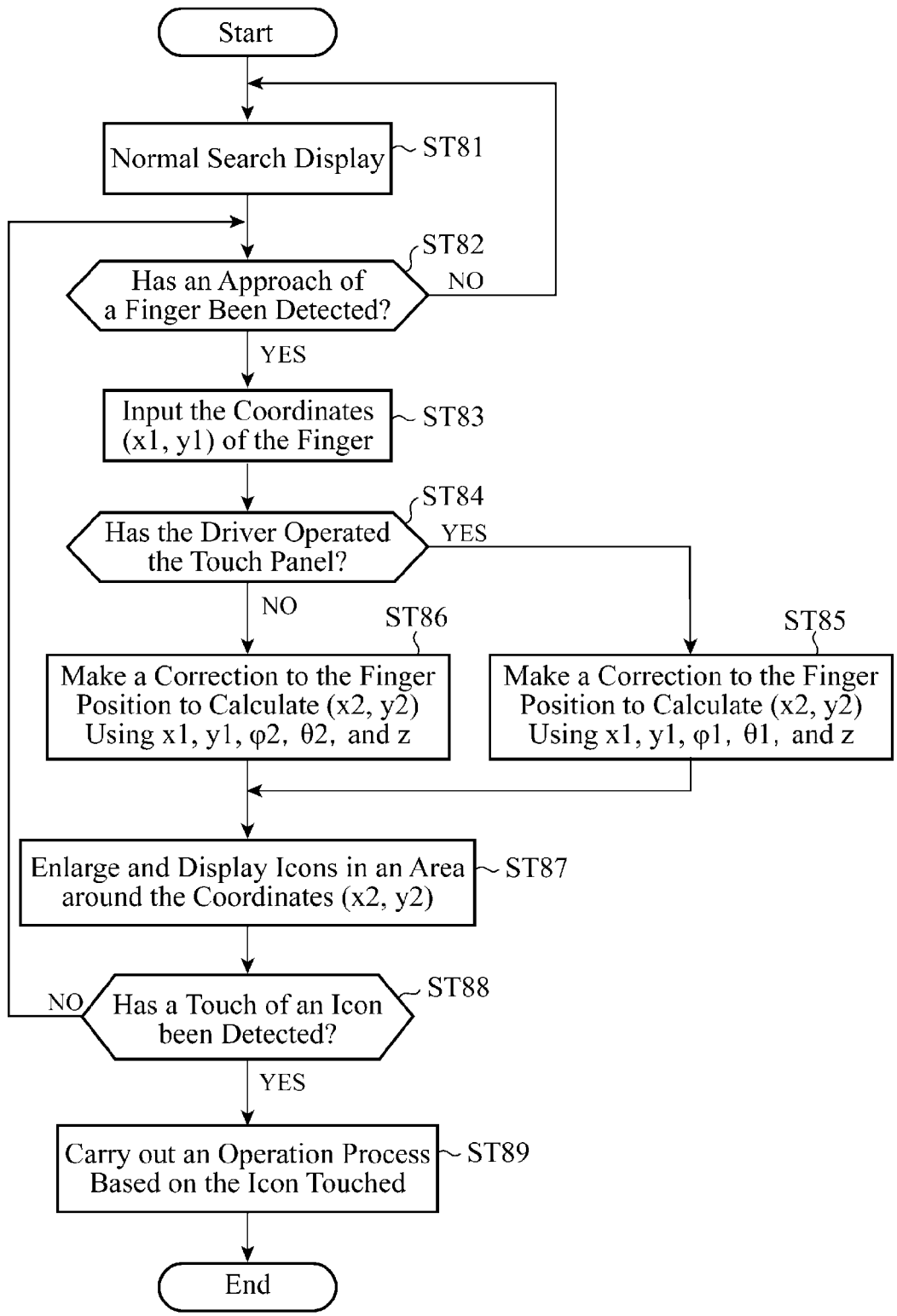
FIG. 8 is a flow chart showing the operation of the display input device in accordance with Embodiment 3 of the present invention.

FIG. 8 is a flow chart showing the operation of the display input device in accordance with Embodiment 3 of the present invention.

Hereafter, the operation of the display input device in accordance with Embodiment 3 of the present invention shown in FIG. 7 will be explained with reference to the flow chart of FIG. 8, focusing on the difference between the operation of the display input device in accordance with Embodiment 3 and that in accordance with Embodiment 1.

In the flowchart of FIG. 8, processes (step ST81 to ST83) including a normal search display, a process of detecting an approach of a finger which is performed by proximity sensors 12, and a process of calculating coordinates of the finger and then inputting the coordinates to the coordinate position correcting unit 303 which is performed by an approaching coordinate position calculating unit 301 are the same as those in steps ST41 to ST43 in Embodiment 1 shown in FIG. 4.

In Embodiment 3 which will be explained hereafter, after acquiring the finger coordinates from the approaching coordinate position calculating unit 301, the coordinate position correcting unit 303 determines whether or not the approach of the finger has been made by the driver on the driver's seat under the control by the main control unit 300 (step ST84). The coordinate position correcting unit 303 can determine from which one of the two directions the finger has approached by acquiring the result which the image processing unit 308 acquires by performing image processing on the image signal from the in-car surveillance camera 4 acquired from the camera image input unit 307.

When, in step ST84, determining that the operation has been performed by the driver, i.e., the approach of the finger has been made from the rightward direction with respect to the touch panel 1 (if "YES" in step ST84), the coordinate position correcting unit 303 determines (x2, y2) by using x1, y1, θ1, φ1 and z, and makes a correction to set (θ1, φ1) (step ST85). In contrast, when determining that the operation has been performed by a passenger on the front seat, i.e., the approach of the finger has been made from the leftward direction with respect to the touch panel 1 (if "NO" in step ST84), the coordinate position correcting unit 303 determines (x2, y2) by using x1, y1, θ2, φ2 and z, and makes a correction to set (θ2, φ2) (step ST86). Although θ=30 degrees and φ=75 degrees are assumed in Embodiment 1, θ1=30 degrees, φ1=75 degrees, θ2=150 degrees, and φ2=75 degrees are assumed in this embodiment.

The image information creating unit 304 then carries out an enlargement process of enlarging an image in a display area having a fixed range on the basis of the coordinates (x2, y2) which the image information creating unit has acquired under the control by the main control unit 300 to create image information for displaying the image in the vicinity of the finger position. The image information creating unit then transfers the created image information to a drawing circuit 31 via an image information transferring unit 305 to create a desired screen display on the touch panel 1 (step ST87).

After that, when a touch sensor 11 of the touch panel 1 detects that the finger has touched an icon (if "YES" in step ST88), a touch coordinate position calculating unit 302 calculates the coordinate position of the touch and then starts an operation information processing unit 306 under the control by the main control unit 300. As a result, the operation information processing unit 306 carries out an operation process based on the key corresponding to the coordinates of the touch calculated by the touch coordinate position calculating unit 302 (step ST89). As a result, the display input device can change the direction and strength of the correction according to the scene in which the display input device is used.

Although not shown in the flow chart of FIG. 8, at the time of a configuration setting or in response to a user's request, the UI providing unit 309 can operate dynamically, display a setting screen on the touch panel 1, capture a setting regarding the direction and strength of the position correction, which is input by the user, and reflect the user setting in the coordinate position correction made by the coordinate position correcting unit 303 via the main control unit 300.

As previously explained, in the display input device in accordance with Embodiment 3 of the present invention, the control unit 3 measures a user's view-point position with respect to the touch panel 1, detects from which one of the leftward and rightward directions with respect to the central axis of the touch panel 1 the user's finger has approached to the touch panel 1, and can change the strength of the correction according to the detected direction. Therefore, the display input device can control the correction with flexibility by, for example, distinguishing between an operation performed by the driver on the driver's seat and that performed by a passenger on the front seat, and making a relatively-weak correction to the detected finger position when determining that a passenger on the front seat has operated the touch panel because the passenger moves freely even when the vehicle is running, whereas making a relatively-strong correction to the detected finger position when determining that the driver on the driver's seat has operated the touch panel because the driver's movement is restricted.

Furthermore, because the display input device in accordance with Embodiment 3 of the present invention provides the user interface to set the strength of the correction, the display input device can provide the correction according to the scene in which the display input device is used. and can provide the user with convenience.

As previously explained, the display input device in accordance with any one of Embodiments 1 to 3 of the present invention is comprised of the touch panel 1 for carrying out a display of an image and an input of an image, the proximity sensors 12 for detecting an approach of a finger to the touch panel 1 in a non-contact manner, and the control unit 3 for correcting the horizontal coordinates of the approaching finger on the touch panel 1, which are acquired by the proximity sensors 12, according to the vertical distance between the touch panel 1 and the finger facing the panel surface, and for carrying out an enlargement process of enlarging an image in a display area having a fixed range which is displayed on the touch panel 1 to display the enlarged image in the vicinity of the finger position. Therefore, the display input device can provide an improvement in its usability independently upon the operational environment of the touch panel 1.

In the display input device in accordance with any one of Embodiments 1 to 3, although only the key icons of the software keyboard are explained as an example of an image displayed in a display area having a fixed range, a specific image, such a cursor or icons on which an input operation is performed by a user in order to make a navigation unit carry out navigation, can be alternatively displayed in the display area. Furthermore, although only a finger is explained as an example of the object to be detected, the object to be detected can be a pen or the like. Even in this case, the same advantages are provided.

Furthermore, in Embodiments 1 to 3 of the present invention, although only the case in which the display input device is applied to vehicle-mounted information equipment, such as a navigation system, is shown, the display input device in accordance with anyone of Embodiments 1 to 3 can be applied not only to vehicle-mounted information equipment, but also to an input output means for a personal computer or an FA (Factory Automation) computer, and a guiding system used for a public institution, an event site, or the like. In the above-mentioned embodiments, although the navigation CPU makes the correction, a CPU can be alternatively disposed in the display unit to make the correction. This variant can provide the same advantages.

The functions of the navigation CPU 30 of the control unit 3 shown in FIG. 2 or 7 can be all implemented via hardware, or at least apart of the functions can be implemented via software. For example, the data process of correcting the horizontal coordinates of the approaching finger on the touch panel 1, which are acquired by the proximity sensors 12, according to the vertical distance between the touch panel 1 and the finger facing the panel surface, and carrying out an enlargement process of enlarging an image in a display area having a fixed range which is displayed on the touch panel 1 to display the enlarged image in the vicinity of the finger position, which is carried out by the control unit 3, can be implemented via one or more programs on a computer, or at least a part of the data process can be implemented via hardware.

Industrial Applicability

Because the display input device in accordance with the present invention can provide an improvement in its usability independently upon the operational environment of the touch panel, the display input device in accordance with the present invention is suitable for use in vehicle-mounted information equipment, such as a navigation system, and so on.

The invention claimed is:

1. A display input device comprising:
a touch panel having a proximity sensor for detecting coordinates of an object to be detected approaching to said touch panel in a non-contact manner, for carrying out a display of an image and an input of an image; and
a control unit for correcting x and y coordinates of said object to be detected which are acquired by said proximity sensor, according to predetermined functions each having, as variables, an angle of elevation $\phi$, an angle of deviation $\theta$ and a z coordinate, a surface of said touch panel being defined as an xy coordinate plane and a direction perpendicular to said surface of said touch panel being defined as a z axis, said angle of elevation $\phi$ being the one of a straight line OC with respect to said surface of said touch panel, the straight line OC extending between a predetermined point O positioned on said touch panel and a predetermined point C positioned outside said touch panel, and said angle of deviation $\theta$ being the one between a straight line which is an orthogonal projection of said line OC onto said xy coordinate plane, and an x axis on said xy coordinate plane.

2. The display input device according to claim 1, wherein said control unit changes a display style of an object in a display area having a fixed range which is displayed on said touch panel, and displays the object in a vicinity of a position shown by the corrected x and y coordinates of said object to be detected.

3. The display input device according to claim 1, wherein said control unit enlarges or reduces an image in a display area having a fixed range which is displayed on said touch panel, and displays the image in a vicinity of a position shown by the corrected x and y coordinates of said object to be detected.

4. The display input device according to claim 1, wherein said control unit calculates the corrected x and y coordinates (x2, y2) of the object to be detected according to following operational expressions: x2=x1−f(z)·cot φ·cos θ and y2=y1−g(z)·cot φ·sin θ, where the x and y coordinates of the object to be detected which are an orthogonal projection of the object to be detected onto said xy coordinate plane are expressed as (x1, y1) and said corrected x and y coordinates of the object to be detected are expressed as (x2, y2), and the functions f(z) and g(z) are i) constant that is equal to or smaller than a predetermined value Zref in a case in which the object to be detected is detectable at a detection distance that is set to the Zref in the z-direction, or ii) set to f(z)≤z and g(z)≤z, respectively, in a case in which the object to be detected is detectable at a variable distance z in the z-direction.

5. The display input device according to claim 1, wherein said control unit changes said correction amount according to said z coordinate.

6. The display input device according to claim 1, wherein said control unit measures a user's view-point position with respect to said touch panel to correct a position of the predetermined point C.

7. The display input device according to claim 1, wherein said control unit detects from which one of leftward and rightward directions the object to be detected has approached to said touch panel with respect to a central axis of said touch panel, and can change a direction or a strength of said correction according to said direction detected thereby.

8. The display input device according to claim 1, wherein said control unit detects a tilt of said touch panel with respect to a central axis of said touch panel and can change an estimated direction or an estimated strength of an eye of said correction according to said tilt detected thereby.

9. The display input device according to claim 1, wherein said control unit can change an estimated direction or an estimated strength of an eye of said correction according to a user setting inputted via said touch panel.

10. A display input device comprising:
a touch panel having a proximity sensor for detecting coordinates of an object to be detected approaching to said touch panel in a non-contact manner, for carrying out a display of an image and an input of an image; and
a control unit for correcting x and y coordinates of said object to be detected which are acquired by said proximity sensor, according in predetermined functions each having, as variables, an angle of elevation φ, an angle of deviation θ and a z coordinate, a surface of said touch panel being defined as an xy coordinate plane and a direction perpendicular to said surface of said touch panel being defined as a z axis, said angle of elevation φ being the one of a straight line L connecting between a point A which is a position of said object to be detected and a predetermined point C positioned outside said touch panel with respect to a point of intersection B of said straight line and said surface of said touch panel, and said angle of deviation θ being the one between a straight line M connecting between a projected point which is an orthogonal projection of the object to be detected onto said xy coordinate plane and said point of intersection B, and an x axis on said xy coordinate plane.

11. The display input device according to claim 10, wherein said control unit changes a display style of an object in a display area having a fixed range which is displayed on said touch panel, and displays the object in a vicinity of a point shown by the corrected x and y coordinates of said object to be detected.

12. The display input device according to claim 10, wherein said control unit enlarges or reduces an image in a display area having a fixed range which is displayed on said touch panel, and displays the image in a vicinity of a position shown by the corrected x and y coordinates of said object to be detected.

13. The display input device according to claim 10, wherein said control unit calculates the corrected x and y coordinates (x2, y2) of the object to be detected according to following operational expressions: x2=x1−f(z)·cot φ·cos θ and y2=y1−g(z)·cot φ·sin θ, where the x and y coordinates of the object to be detected which are an orthogonal projection of the object to be detected onto said xy coordinate plane are expressed as (x1, y1) and said corrected x and y coordinates of the object to be detected are expressed as (x2, y2) and the functions f(z) and g(z) are i) constant that is equal to or smaller than a predetermined value Zref in a case in which the object to be detected is detectable at a detection distance that is set to the Zref in the z-direction, or ii) set to f(z)≤z and g(z)≤z, respectively, in a case in which the object to be detected is detectable at a variable distance z in the z-direction.

14. The display input device according to claim 10, wherein said control unit changes said correction amount according to said z coordinate.

15. The display input device according to claim 10, wherein said control unit measures a users view-point position with respect to said touch panel to correct a position the predetermined point C.

16. The display input device according to claim 10, wherein said control unit detects from which one of leftward and rightward directions the object to be detected has approached to said touch panel with respect to a central axis of said touch panel, and can change a direction or a strength of said correction according to said direction detected thereby.

17. The display input device according to claim 10, wherein said control unit detects a tilt of said touch panel with respect to a central axis of said touch panel and can change an estimated direction or an estimated strength of an eye of said correction according to said tilt detected thereby.

18. The display input device according to claim 10, wherein said control unit can change an estimated direction or an estimated strength of an eye of said correction according to a user setting inputted via said touch panel.

19. Vehicle-mounted information equipment which can be connected to a touch panel having a proximity sensor for detecting coordinates of an object to be detected approaching to said touch panel in a non-contact manner, for carrying out a display of an image and an input of an image, said vehicle-mounted information equipment comprising:
a control unit for receiving the coordinates of said object to be detected inputted thereto from said proximity sensor to correct x and y coordinates of said object to be detected, which are acquired by said proximity sensor, according to predetermined functions each having, as variables, an angle of elevation φ, an angel of device θ and a z coordinate, a surface of said touch panel being defined as an xy coordinate plane and a direction perpendicular to said surface of said touch panel being defined as a z axis, said angle of elevation φ being the one of a straight line OC with respect to said surface of said touch panel, the straight line OC extending between a predetermined point O positioned on said touch panel and a predetermined point C positioned outside said touch panel, and said angle of deviation θ being the one between a straight line which is on orthogonal projection of said line OC onto said xy coordinate plane, and an x axis on said xy coordinate plane.

20. Vehicle-mounted information equipment which can be connected to a touch panel having a proximity sensor for detecting coordinates of an object to be detected approaching to said touch panel in a non-contact manner, for carrying out a display of an image and an input of an image, said vehicle-mounted information equipment comprising:

a control unit for receding the coordinates of said object to be detected inputted thereto from said proximity sensor to correct x and y coordinates of said object to be detected, which are acquired by said proximity sensor, according to predetermined functions each having, as variables, an angle of elevation φ, an angle of deviation θ and a z coordinate, a surface of said touch panel being defined as an xy coordinate plane and a direction perpendicular to said surface of said touch panel being defined as a z axis, said angle of elevation φ being the one of a straight line L connecting between a point A which is a position of said object to be detected and a predetermined point C positioned outside said touch panel with respect to a point of intersection B of said straight line and said surface of said touch panel, and said angle of deviation θ being the one between a straight line M connecting between a projected point which is an orthogonal projection of the object to be detected onto said xy coordinate plane and said point of intersection B, and an x axis on said xy coordinate plane.

21. The vehicle-mounted information equipment according to claim 19 or 20, wherein said touch panel has a touch sensor for detecting coordinates of a touch of the object to be detected onto said touch panel, and said control unit performs a navigation process on a basis of the coordinates inputted thereto from said touch sensor.

* * * * *